United States Patent
Núñez et al.

(10) Patent No.: US 12,293,458 B2
(45) Date of Patent: *May 6, 2025

(54) SYSTEMS AND METHODS FOR GENERATING AUGMENTED REALITY ENVIRONMENTS FROM TWO-DIMENSIONAL DRAWINGS

(71) Applicant: Insurance Services Office, Inc., Jersey City, NJ (US)

(72) Inventors: Juan Carlos Núñez, San Pedro de Alcántara (ES); Francisco Rivas, Madrid (ES); Alberto Martin, Carranque (ES)

(73) Assignee: Insurance Services Office, Inc., Jersey City, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/205,028

(22) Filed: Jun. 2, 2023

(65) Prior Publication Data
US 2023/0326133 A1    Oct. 12, 2023

Related U.S. Application Data

(63) Continuation of application No. 17/468,096, filed on Sep. 7, 2021, now Pat. No. 11,694,399, which is a
(Continued)

(51) Int. Cl.
*G06T 17/10* (2006.01)
*G06T 7/536* (2017.01)
(Continued)

(52) U.S. Cl.
CPC ............ *G06T 17/10* (2013.01); *G06T 7/536* (2017.01); *G06T 7/70* (2017.01); *G06T 7/80* (2017.01); *G06T 19/006* (2013.01)

(58) Field of Classification Search
None
See application file for complete search history.

(56) References Cited

U.S. PATENT DOCUMENTS 11,113,879 B2    9/2021   Nunez et al.
11,694,399 B2    7/2023   Núñez et al.
(Continued)

OTHER PUBLICATIONS

International Search Report of the International Searching Authority mailed on Jan. 30, 2020, issued in connection with International Application No. PCT/US2019/61984 (3 pages).
(Continued)

*Primary Examiner* — Frank S Chen
(74) *Attorney, Agent, or Firm* — McCarter & English, LLP

(57) ABSTRACT

Systems and methods for generating augmented reality environments from 2D drawings are provided. The system performs a camera calibration process to determine how a camera transforms images from the real world into a 2D image plane. The system calculates a camera pose and determines an object position and an object orientation relative to a known coordinate system. The system detects and processes a 2D drawing/illustration and generates a 3D model from the 2D drawing/illustration. The system performs a rendering process, wherein the system generates an augmented reality environment which includes the 3D model superimposed on an image of the 2D drawing/illustration. The system can generate the augmented reality environment in real time, allowing the system to provide immediate feedback to the user. The images processed by the system can be from a video, from multiple image photography, etc.

30 Claims, 13 Drawing Sheets

Related U.S. Application Data continuation of application No. 16/686,977, filed on Nov. 18, 2019, now Pat. No. 11,113,879.

(60) Provisional application No. 62/768,291, filed on Nov. 16, 2018.

(51) Int. Cl.
  *G06T 7/70* (2017.01)
  *G06T 7/80* (2017.01)
  *G06T 19/00* (2011.01)

(56) References Cited

U.S. PATENT DOCUMENTS

| | | | |
|---|---|---|---|
| 2005/0275914 | A1 | 12/2005 | Vesely et al. |
| 2017/0249745 | A1 | 8/2017 | Fiala |
| 2018/0213217 | A1 | 7/2018 | Yu et al. |
| 2019/0026958 | A1* | 1/2019 | Gausebeck ............ H04N 13/10 |
| 2020/0160599 | A1 | 5/2020 | Núñez et al. |
| 2021/0407192 | A1 | 12/2021 | Nunez et al. |

OTHER PUBLICATIONS

Written Opinion of the International Searching Authority mailed on Jan. 30, 2020, issued in connection with International Application No. PCT/US2019/61984 (8 pages).

Office Action mailed Oct. 14, 2020, issued in connection with U.S. Appl. No. 16/686,977 (64 pages).

Notice of Allowance mailed Apr. 27, 2021, issued in connection with U.S. Appl. No. 16/686,977 (5 pages).

Extended European Search Report dated Jul. 15, 2022, issued by the European Patent Office issued in connection with European Patent Application No. 19885820.1 (8 pages).

Ahmed, et al., "Automatic Room Detection and Room Labeling from Architectural Floor Plans," 2012 10th IAPR International Workshop on Document Analysis Systems (5 pages).

Park, et al., "Barcode-Assisted Planar Object Tracking Method for Mobile Augmented Reality," 2011 International Symposium on Ubiquitous Virtual Reality (4 pages).

Langlotz, et al., "Sketching Up the World: In Situ Authoring for Mobile Augmented Reality," Personal and Ubiquitous Computing, Springer Verlag, vol. 16, No. 6, Jul. 27, 2011 (8 pages).

Feng, et al., "MagicToon: A 2D-to-3D Creative Cartoon Modeling System with Mobile AR," 2017 IEEE Virtual Reality (VR) (10 pages).

Office Action mailed Jul. 27, 2022, issued in connection with U.S. Appl. No. 17/468,096 (10 pages).

Notice of Allowance mailed Mar. 3, 2023, issued in connection with U.S. Appl. No. 17/468,096 (7 pages).

Examination Report No. 1 dated Mar. 14, 2024, issued by the Australian Patent Office issued in connection with Australian Patent Application No. 2019379823 (3 pages).

* cited by examiner

SYSTEMS AND METHODS FOR GENERATING AUGMENTED REALITY ENVIRONMENTS FROM TWO-DIMENSIONAL DRAWINGS

RELATED APPLICATIONS

This application is a continuation application of U.S. patent application Ser. No. 17/468,096 filed on Sep. 7, 2021, which is a continuation application of U.S. patent application Ser. No. 16/686,977 filed on Nov. 18, 2019 (now issued U.S. Pat. No. 11,113,879, issued on Sep. 7, 2021), which claims the benefit of U.S. Provisional Application Ser. No. 62/768,291 filed Nov. 16, 2018, the entire disclosures of which are expressly incorporated herein by reference.

BACKGROUND

Technical Field

The present disclosure relates generally to the field of computer-generated augmented reality. More specifically, the present disclosure relates to systems and methods for generating augmented reality environments from two-dimensional (2D) drawings.

Related Art

Augmented reality is a technology that generates computer-generated images and superimposes such images on a user's view of the real world. Such technology provides a composite view whereby objects that reside in the real-world are augmented by computer-generated images and/or information.

Augmented reality systems are capable of processing 2D images. However, these systems generally do not accurately generate three-dimensional (3D) augmented reality models from 2D illustrations, such as from drawings, in real-time. As such, the ability to generate accurate and complete 3D models from 2D illustrations is a powerful tool. Accordingly, the computer vision systems and methods disclosed herein solve these and other needs.

SUMMARY

This present disclosure relates systems and methods for generating augmented reality environments from 2D drawings. The system performs a camera calibration process to determine how a camera transforms images from the real world into a 2D image plane. The system then calculates a camera pose and determines an object position and an object orientation relative to a known coordinate system. Next, the system detects and processes a 2D drawing/illustration and generates a 3D model from the 2D drawing/illustration. Lastly, the system performs a rendering process, wherein the system generates an augmented reality environment which includes the 3D model superimposed on an image of the 2D drawing/illustration. The system can generate the augmented reality environment in real time, allowing the system to provide immediate feedback to the user. The images processed by the system can be from a video, from multiple image photography, etc.

BRIEF DESCRIPTION OF THE DRAWINGS

The foregoing features of the invention will be apparent from the following Detailed Description, taken in connection with the accompanying drawings, in which.

DETAILED DESCRIPTION

The present disclosure relates to systems and methods for generating augmented reality environments from 2D drawings, as described in detail below in connection with FIGS. 1-13.

Figure 1:
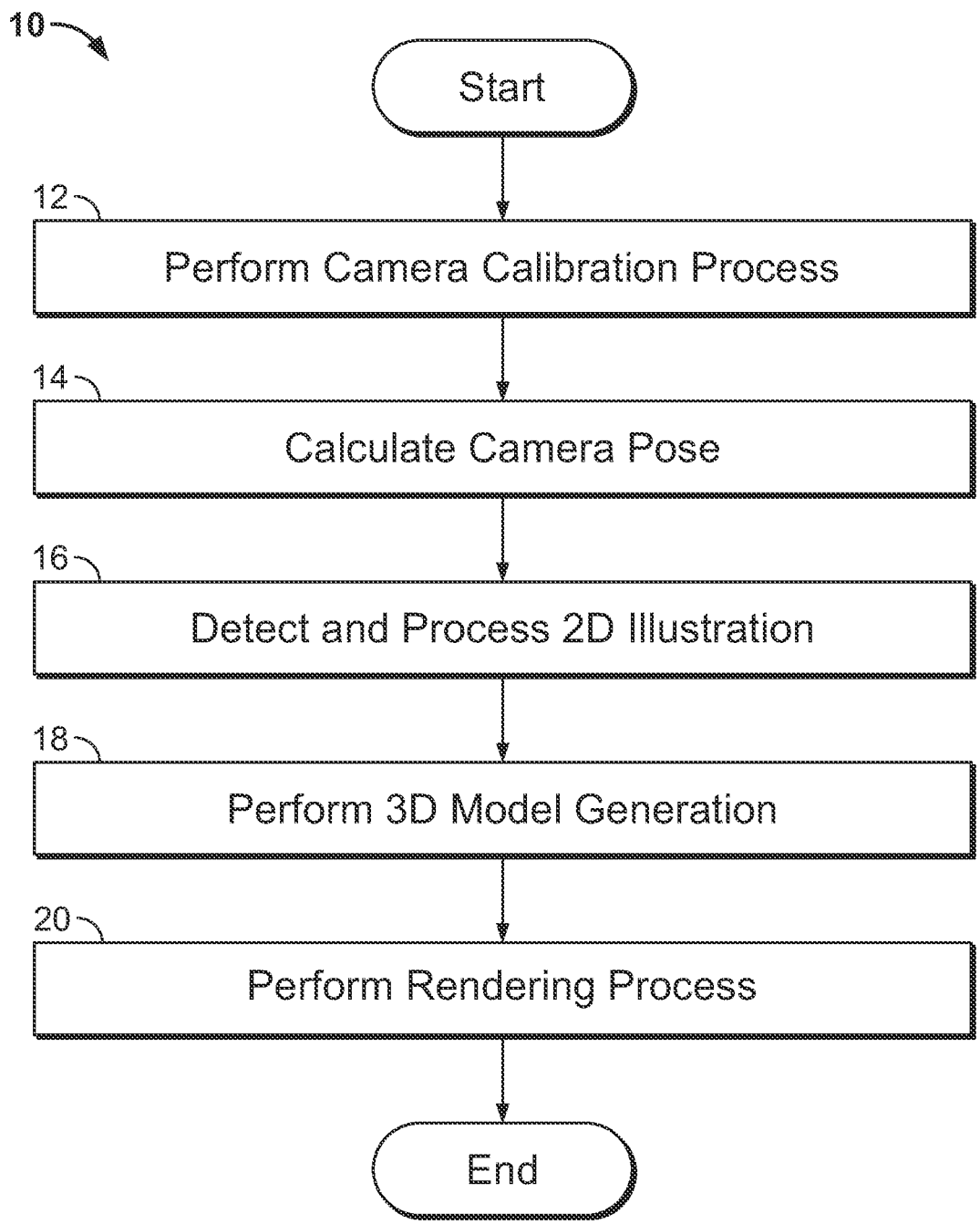
FIG. 1 is a flowchart illustrating overall process steps carried out by the system of the present disclosure.

FIG. 1 is a flowchart illustrating the overall process steps carried out by the system, indicated generally at 10. In step 12, the system performs a camera calibration process. The camera calibration process is used to determine how a camera transforms images from the real world into a 2D image plane by determining camera parameters such as, for example, intrinsic camera parameters. It should be understood that there can be different camera parameters for different camera models and types. In step 14, the system calculates a camera pose. Specifically, the system determines an object position and an object orientation relative to a known coordinate system. In step 16, the system detects and processes a 2D drawing. In step 18, the system generates a three-dimensional (3D) model based on the 2D drawing. In step 20, the system performs a rendering process, wherein the system generates an augmented reality environment wherein the 3D model is displayed superimposed on an image of the 2D drawing. The augmented reality environment could be displayed on a user's smart phone, a computer screen, in a virtual reality (VR) headset/goggles, etc.

Figure 2:
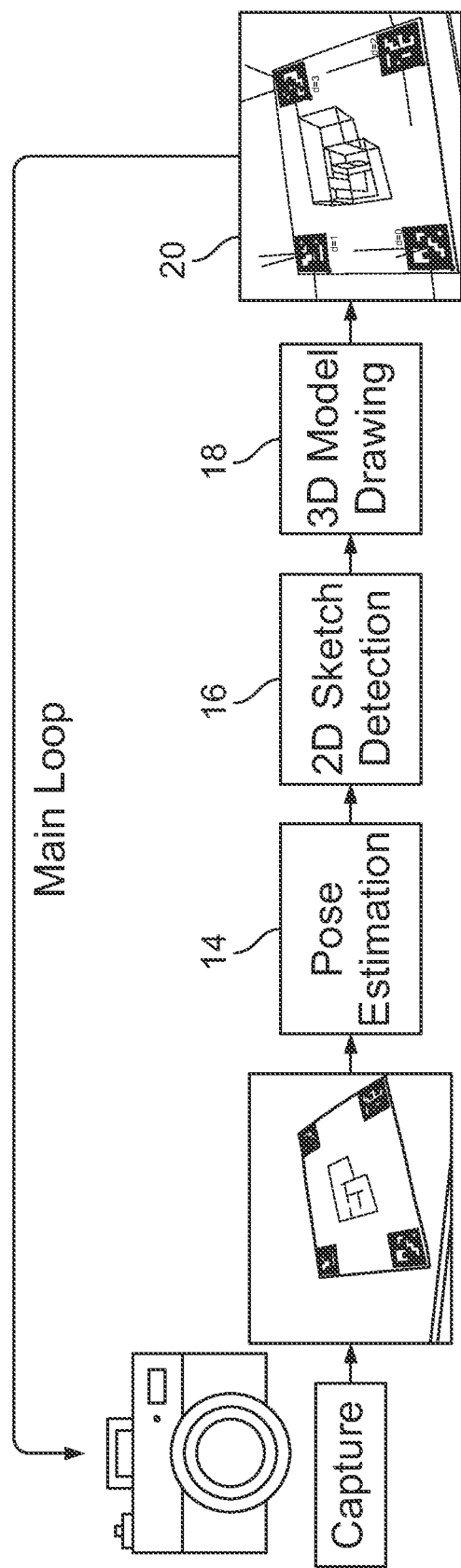
FIG. 2 is a diagram illustrating the overall process steps of FIG. 1 in greater detail.

Preferably, the system performs steps 14-20 in real time, e.g., using a a real-time loop. The real-time loop allows the system to provide immediate feedback to the user. During the real-time loop, the system executes an image flow where the system captures and processes images at a predetermined frequency (e.g., at a rate specified in frames per second). For example, the system can capture and process images at least 20 frames per second (e.g., each pass through the loop occurs in 50 milliseconds or less). The images can be obtained from a video, from multiple image photography, etc. FIG. 2 is an illustration showing the real-time loop. Each step of FIG. 1 will be described in greater detail below.

It should be understood that FIG. 1 is only one potential configuration, and the system of the present disclosure can be implemented using a number of different configurations. The process steps of the invention disclosed herein could be embodied as computer-readable software code executed by one or more computer systems, and could be programmed using any suitable programming languages including, but not limited to, C, C++, C #, Java, Python or any other suitable language. Additionally, the computer system(s) on which the present disclosure may be embodied includes, but is not limited to, one or more personal computers, servers, mobile devices, cloud-based computing platforms, etc., each having one or more suitably powerful microprocessors and associated operating system(s) such as Linux, UNIX, Microsoft Windows, MacOS, etc. Still further, the invention could be embodied as a customized hardware component such as a field-programmable gate array ("FPGA"), application-specific integrated circuit ("ASIC"), embedded system, or other customized hardware component without departing from the spirit or scope of the present disclosure.

Figure 3:
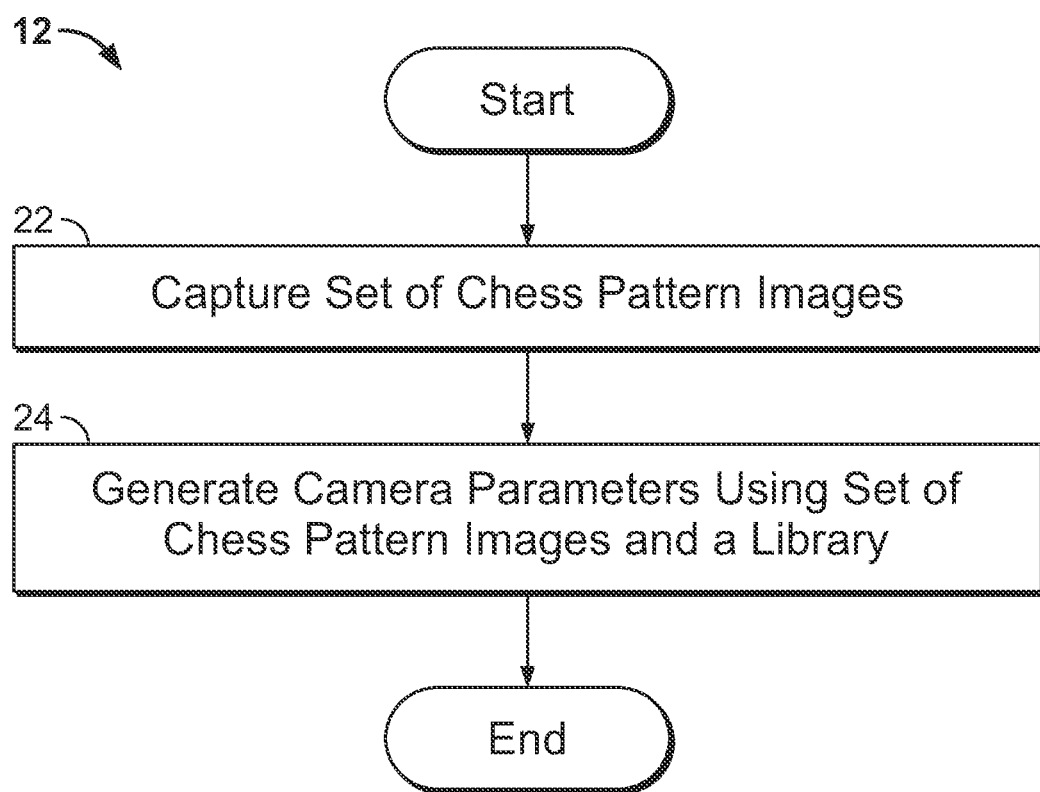
FIG. 3 is a flowchart illustrating step 12 of FIG. 1 in greater detail.

FIG. 3 is a flowchart illustrating step 12 of FIG. 1 in greater detail. In particular, FIG. 3 illustrates process steps performed during the camera calibration process. In step 22, the system captures a set of "chess pattern" images having different perspectives. For example, the set can include twenty-five or less chess pattern images. Chess pattern images use a pattern similar in appearance to that of a chess board, which includes alternating clear and dark zones. In step 24, the system generates camera parameters using the set of chess pattern images and a library. In an example, the system uses an optimization procedure to compute the camera's parameters. The parameters can be intrinsic camera parameters and/or extrinsic camera parameters. The library can be a publically available library, such as the OpenCV library, and/or a private library. The OpenCV library provides functionality for camera parameter calibration, wherein images are capture which include a chessboard with known dimensions of the square side. The calibration function processes the chessboard pattern by computer vision algorithms to detect each interior corner of the pattern. Knowing the dimensions of the square, and the number of squares contained in the chessboard, a 3D-2D correspondence is obtained. The optimization procedure finds the best intrinsic camera parameters which minimize the error between the projected 3D points on camera plane and the detected 2D interior corners. The camera calibration functionality of the OpenCV library finds a chess pattern in the set of images provided to the library, and the system attempts to detect the chess board with a given dimension.

Figure 4:
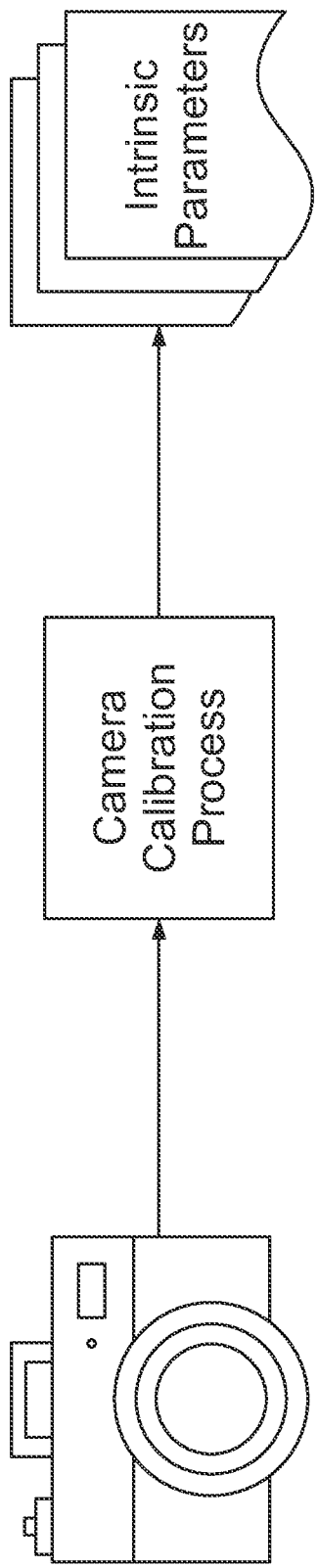
FIG. 4 is a diagram illustrating the camera calibration process of the present disclosure.

FIG. 4 is an illustration showing the camera calibration process. It should be noted that the camera calibration process can be performed off-line or on-line, and/or performed once for a given camera. Internally, the process stores a parametrized virtual 3D plane (chess board). The process need not be carried out if camera parameters are provided by the manufacturer.

Figure 5:
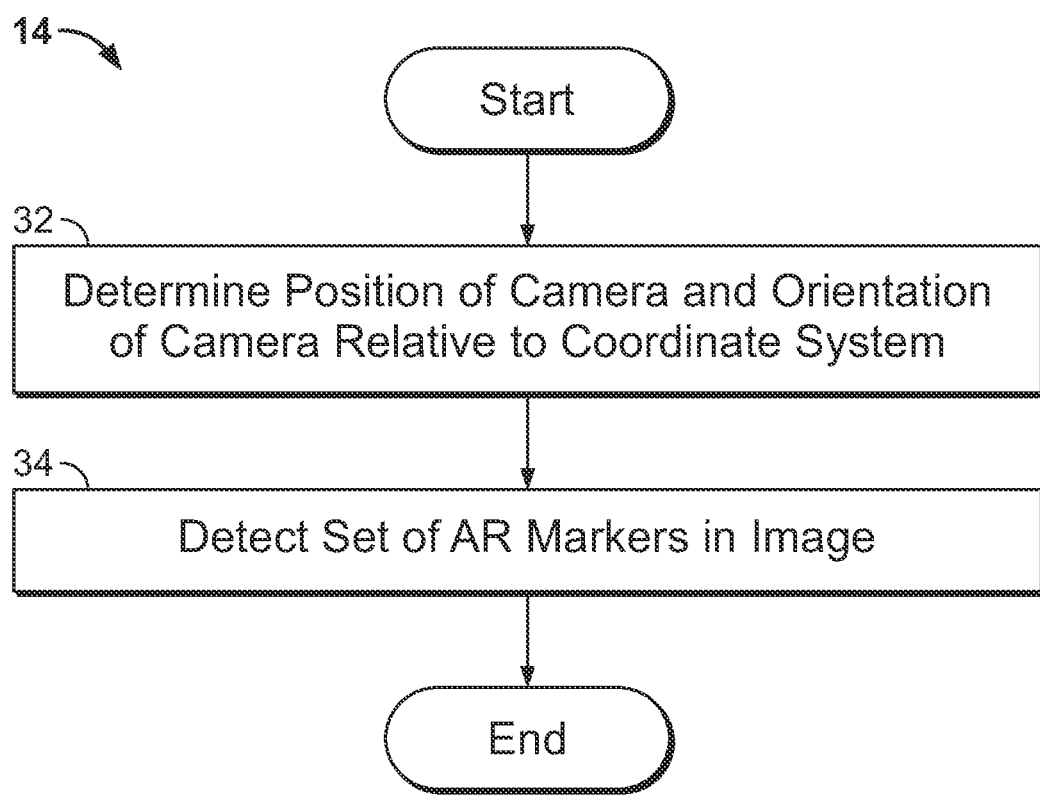
FIG. 5 is a flowchart illustrating step 14 of FIG. 1 in greater detail.

FIG. 5 is a flowchart illustrating step 14 of FIG. 1 in greater detail. In particular, FIG. 5 illustrates process steps performed by the system for calculating the camera pose. It should be understood that the process performed in FIG. 5 is based on finding correspondences between points in the real world and their 2D image projection. Synthetic or fiducial markers can be used to aid in this process. In the method and systems discussed herein, binary square fiducial markers (e.g., AR markers) are be used. However, it should be understood that any synthetic or fiducial markers can be used. Those skilled in the art would understand that the OpenCV library includes the ArUco module, which allows for working with the AR markers. However, other libraries, modules, or sources can be used.

In step 32, the system determines a position of the camera and an orientation of the camera relative to a coordinate system. The coordinate system will be referenced to a set of AR markers, from which the camera is localized. As will be discussed in greater detail below, the position and orientation can be used to manipulate an object in a 3D world coordinate system.

Figure 6:
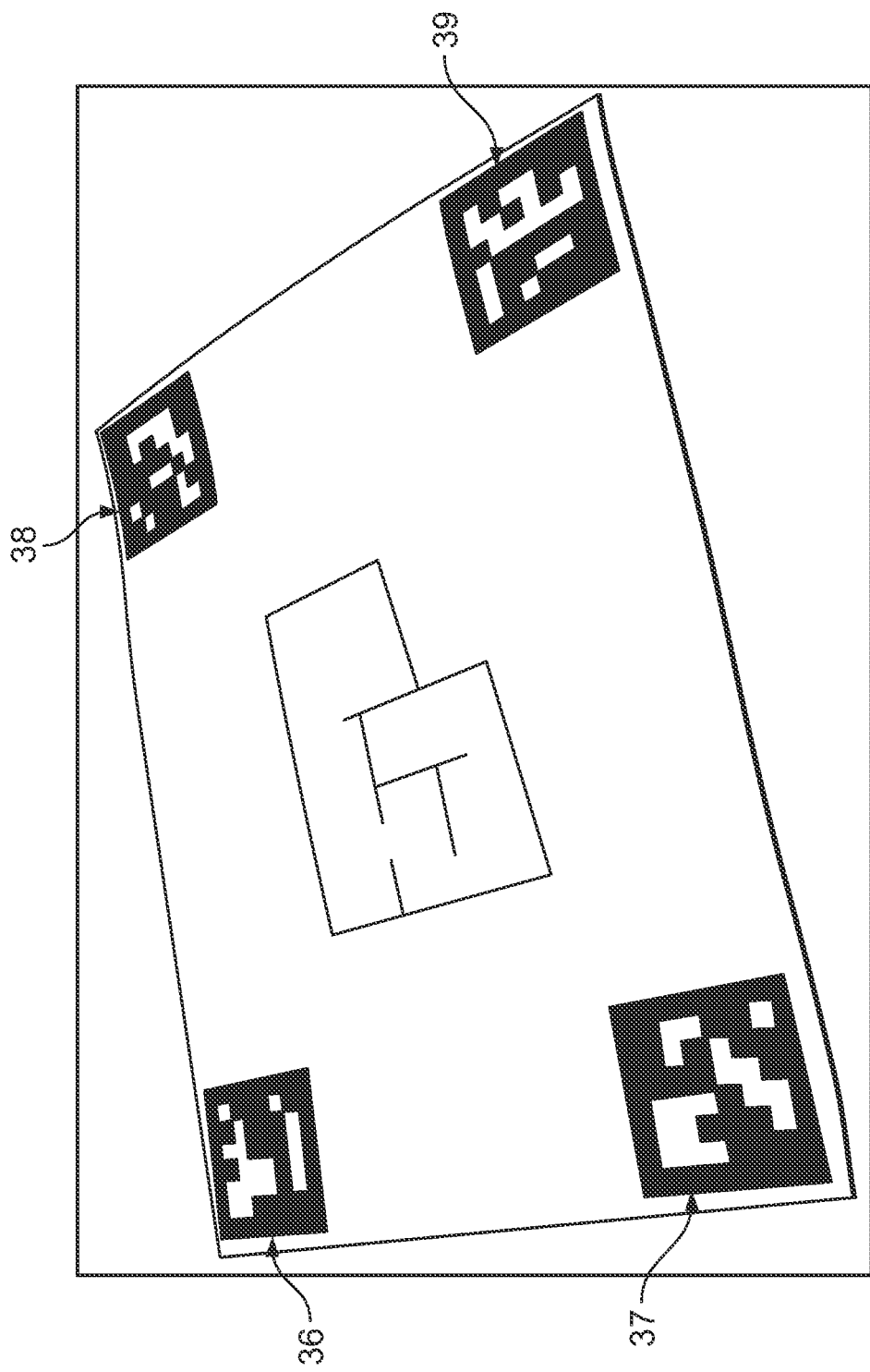
FIG. 6 is a diagram illustrating a 2D drawing that includes a set of markers.

In step 34, the system detects a set of AR markers in an image. In an example, the system can detect the AR markers using the ArUco functionality of the OpenCV library, where the image is analyzed by applying adaptive thresholding in order to detect square shaped candidates. The system then classifies each candidate by analyzing the candidate's inner codification and, also, obtains a set of points and parameters for each AR marker detected on the image. The points and parameters can include AR marker exterior corners, AR marker interior corners, relative camera parameters (e.g., a pose), etc. The set of AR markers, in an example, includes four AR markers. However, it should be understood that other quantities of AR markers can be used. FIG. 6 is an illustration showing the set of four AR markers, where each AR marker has a different pattern 36, 37, 38, 39.

Figure 7:
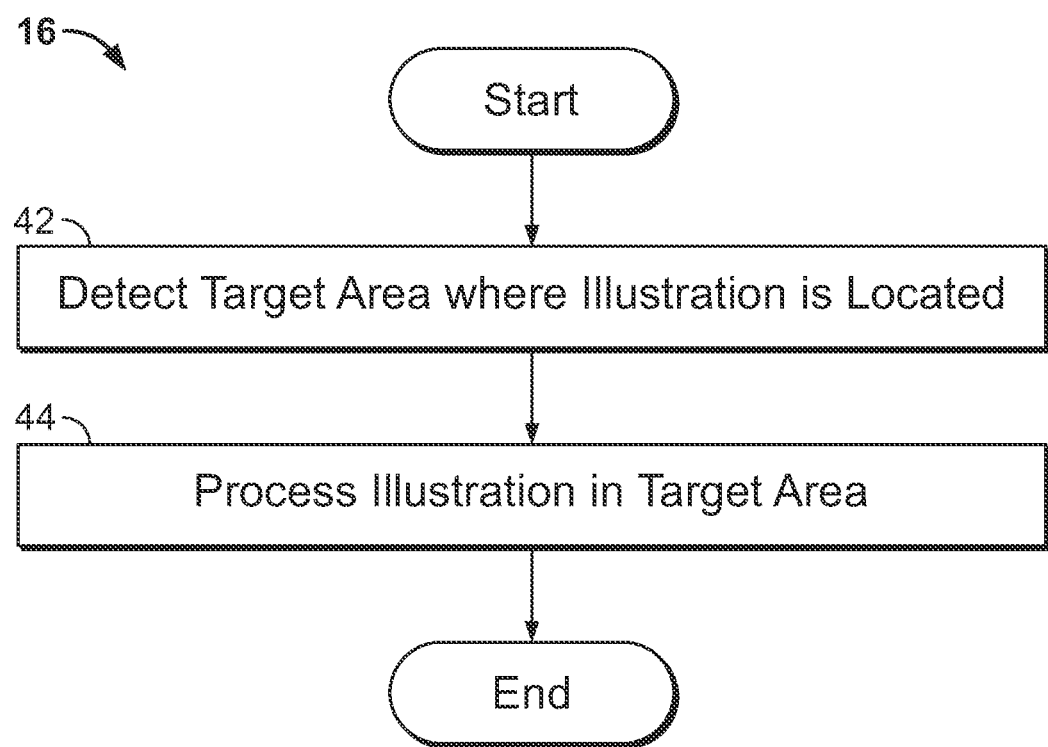
FIG. 7 is a flowchart illustrating step 16 of FIG. 1 in greater detail.

FIG. 7 is a flowchart illustrating step 16 of FIG. 1 in greater detail. In particular, FIG. 7 illustrates process steps performed for detecting and processing a 2D illustration. The detecting and processing can be performed by real-time computer vision techniques, or any other computer techniques capable of meeting the required real-time constraints. The illustration can be a sketch, a drawing, a design, a picture, a painting, or any other type of 2D rendering.

Figure 8A:
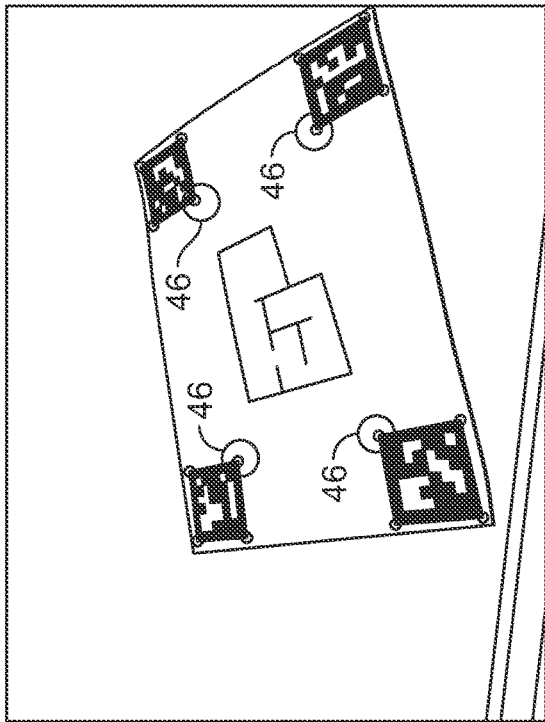
FIGS. 8A-C are diagrams illustrating the system of the present disclosure detecting a target area where the drawing is located.
Figure 8B:
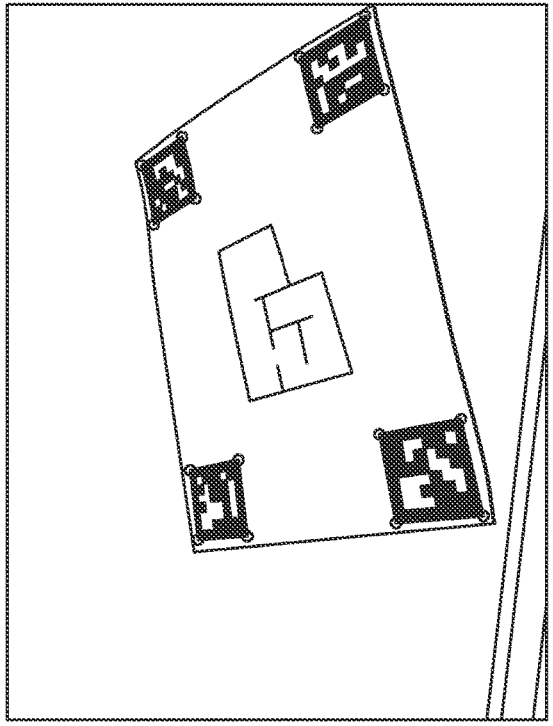
Figure 8C:
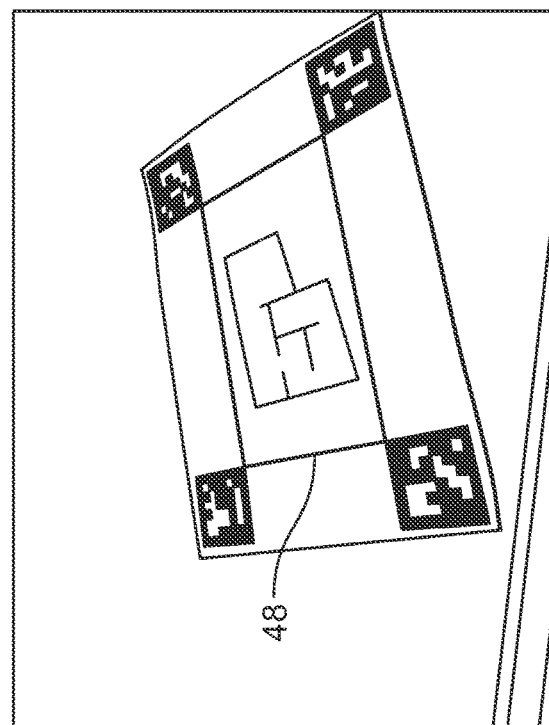

In step 42, the system detects a target area where the illustration is located. Specifically, the system first locates the exterior corners of each AR marker, as illustrated in FIG. 8A. In the set of four AR markers, there are 16 exterior corners. Next, the system determines four interior corners 46, one from each of the four AR markers, as seen in FIG. 8B. Finally, the system 10 defines the target area 48 based on the interior corners 46, as seen in FIG. 8C.

Figure 9:
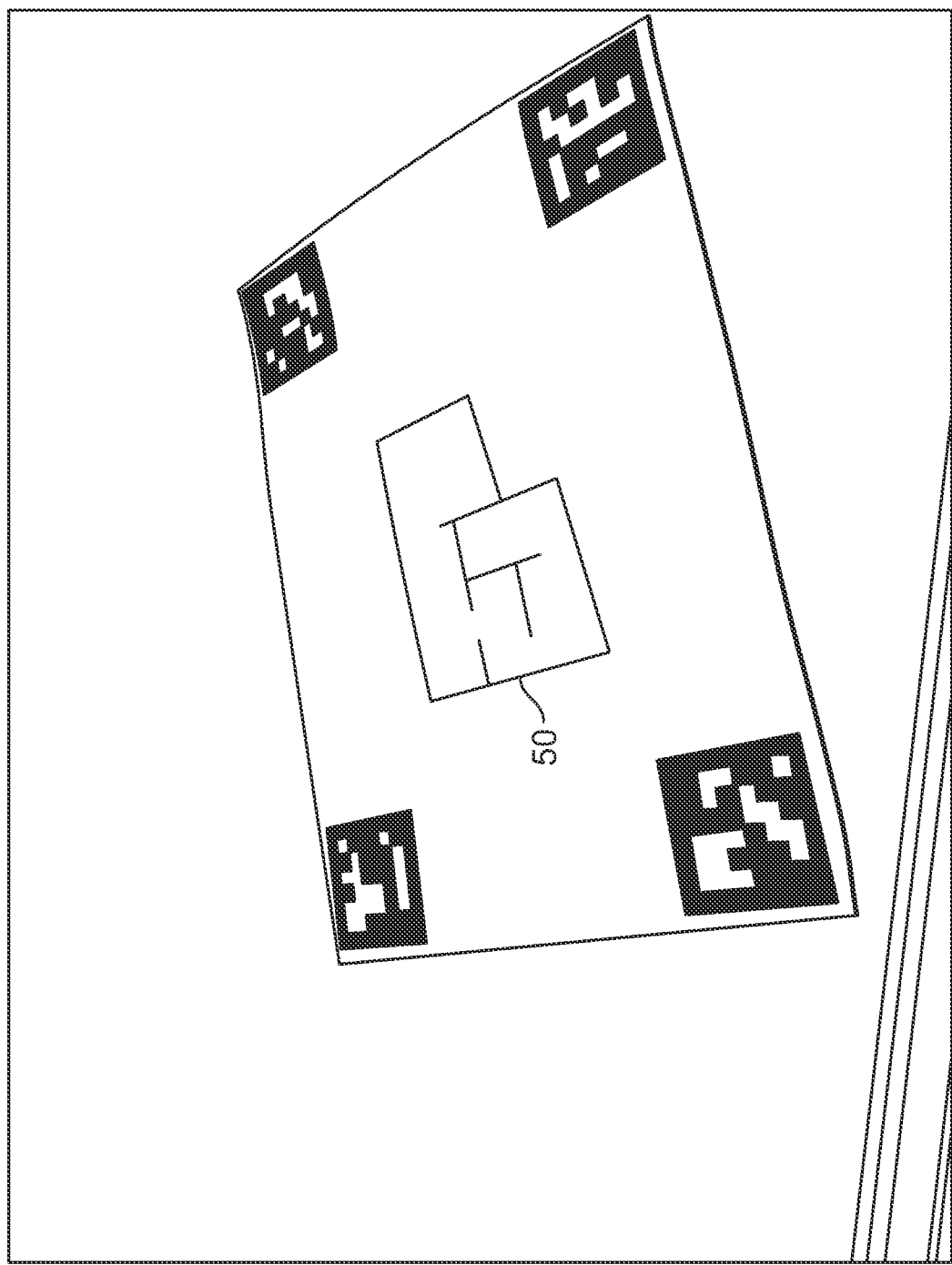
FIG. 9 is a diagram illustrating lines in the drawing being detected by the system.

In step 44, the system processes the illustration in the target area. Specifically, the system detects 2D line segments within the target area using a suitable line segment detection ("LSD") algorithm. Those skilled in the art would understand that other algorithms can be used as well. The LSD algorithm detects locally straight contours on images and is designed to work without parameter tuning. Robust lines are detected and intersected to find corners candidates in the illustration. FIG. 9 is an illustration showing detected lines 50 in the illustration.

Figure 10:
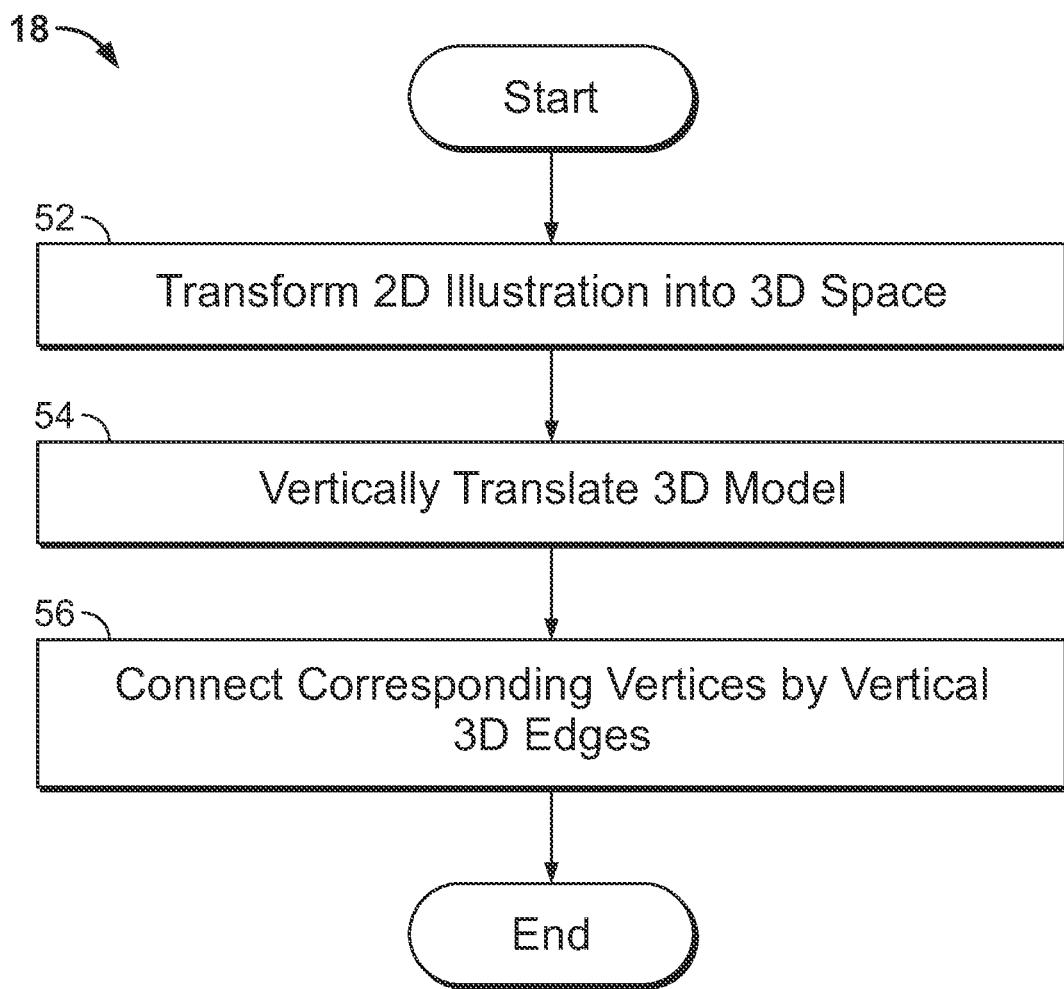
FIG. 10 is a diagram illustrating step 18 of FIG. 1 in greater detail.
Figure 11:
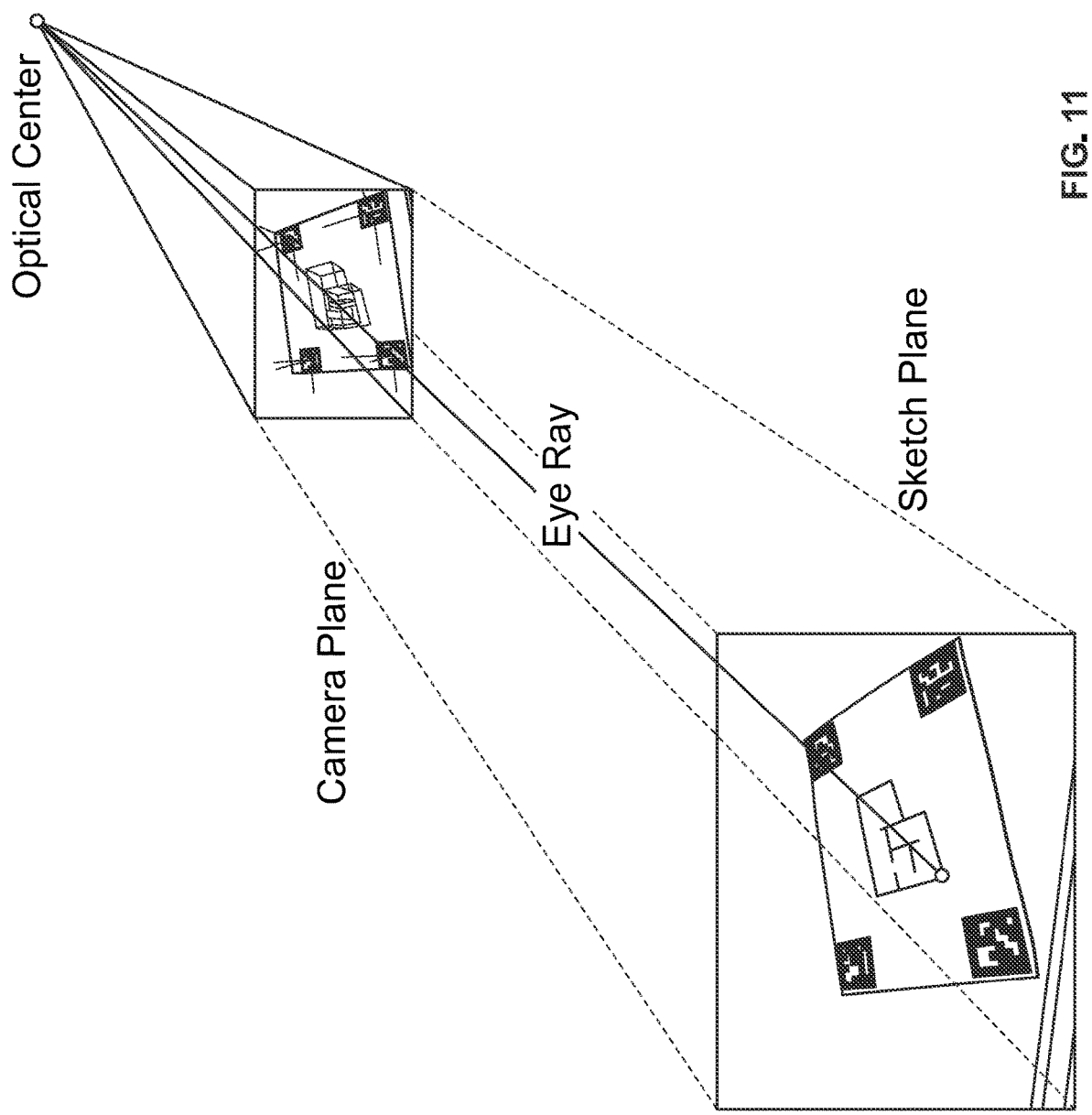
FIG. 11 is a diagram illustrating the system 10 computing an intersection between the reference plane and an eye ray passing through an optical center and the corners of the 2D illustration.

FIG. 10 is a flowchart illustrating step 18 of FIG. 1 in greater detail. In particular, FIG. 10 illustrates process steps performed for generating a 3D model from the detected 2D illustration. In step 52, the system transforms the 2D illustration into a 3D space by projecting each sketch line into the 3D plane where the AR markers are located (e.g., reference plane). This is achieved by the system by computing an intersection between the reference plane and an eye ray which goes through an optical center and the corners of the 2D illustration, as shown in FIG. 11. This results in the 3D coordinates of the detected illustration being obtained and referenced to the coordinate system defined by the AR markers.

Figure 12:
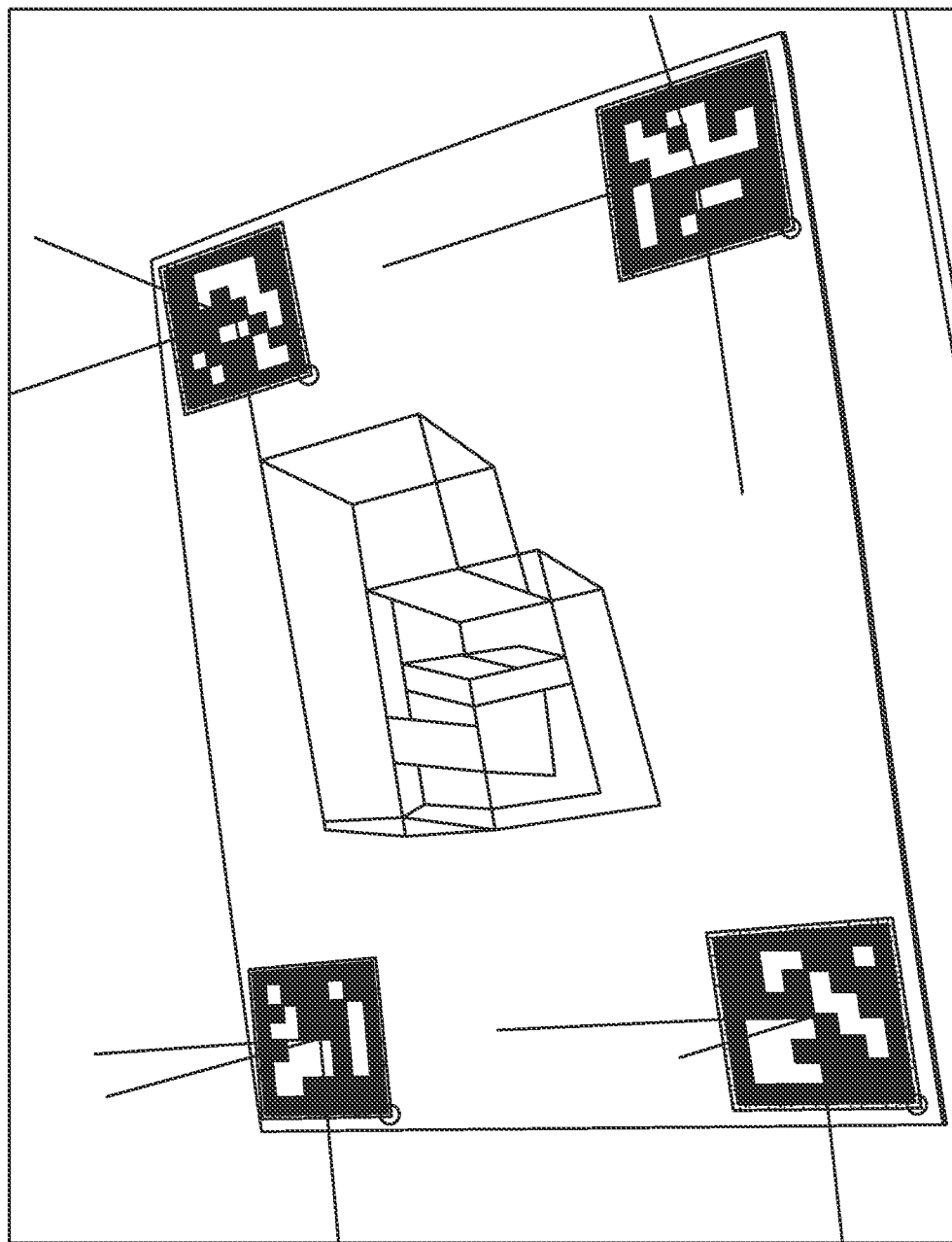
FIG. 12 is a diagram illustrating a frame from a video calculated and rendered in real time using the systems and methods of the present disclosure.

In step 54, the model is projected on the reference plane and elevated to a given height to build the volumetric 3D space. The 3D model can be translated by an arbitrary distance or a predetermined distance. In step 56, the system connects corresponding vertices by vertical 3D edges, which provides a complete 3D model referenced to the AR marker coordinates. The system then renders the 3D model via step 20 of FIG. 1, and creates an augmented reality environment that includes the 3D model displayed superimposed on an image of the 2D drawing/illustration. In an example, the system renders the 3D model by projecting the 3D model back onto the camera plane using the intrinsic camera parameters and pose. FIG. 12 is an illustration showing a frame from a video calculated and rendered in real time using the systems and methods disclosed herein.

Figure 13:
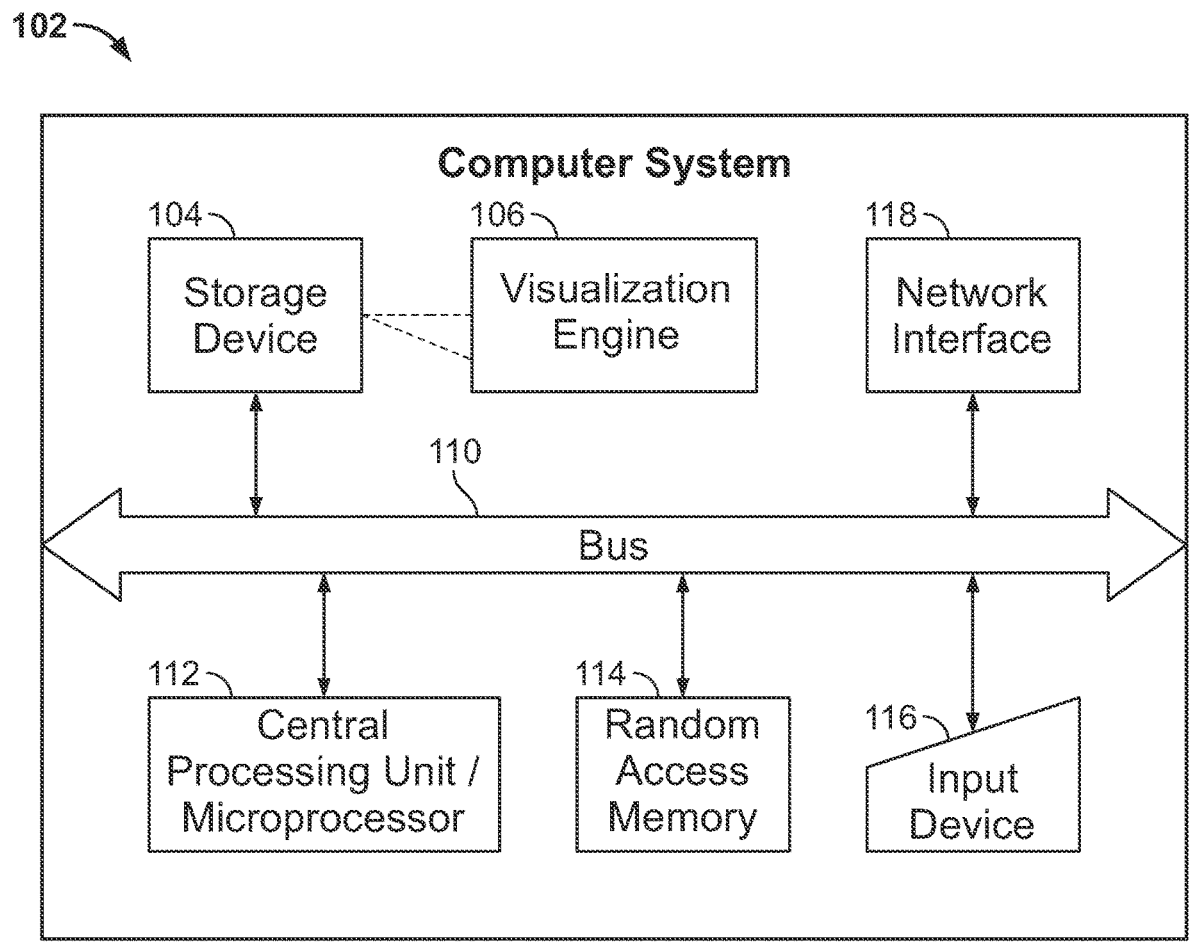
FIG. 13 is a diagram illustrating sample hardware components on which the system of the present disclosure could be implemented.

FIG. 13 is a diagram illustrating hardware and software components of a computer system on which the system of the present disclosure could be implemented. The system includes a processing server 102 which could include a storage device 104, a network interface 118, a communications bus 110, a central processing unit (CPU) (microprocessor) 112, a random access memory (RAM) 114, and one or more input devices 116, such as a keyboard, mouse, etc. The server 102 could also include a display (e.g., liquid crystal display (LCD), cathode ray tube (CRT), etc.). The storage device 104 could comprise any suitable, computer-readable storage medium such as disk, non-volatile memory (e.g., read-only memory (ROM), erasable programmable ROM (EPROM), electrically-erasable programmable ROM (EEPROM), flash memory, field-programmable gate array (FPGA), etc.). The server 102 could be a networked computer system, a personal computer, a smart phone, tablet computer etc. It is noted that the server 102 need not be a networked server, and indeed, could be a stand-alone computer system.

The functionality provided by the present disclosure could be provided by an visualization program/engine 106, which could be embodied as computer-readable program code stored on the storage device 104 and executed by the CPU 112 using any suitable, high or low level computing language, such as Python, Java, C, C++, C #, .NET, MATLAB, etc. The network interface 108 could include an Ethernet network interface device, a wireless network interface device, or any other suitable device which permits the server 102 to communicate via the network. The CPU 112 could include any suitable single- or multiple-core microprocessor of any suitable architecture that is capable of implementing and running the visualization program 106 (e.g., Intel processor). The random access memory 114 could include any suitable, high-speed, random access memory typical of most modern computers, such as dynamic RAM (DRAM), etc. The input device 116 could include a microphone for capturing audio/speech signals, for subsequent processing and recognition performed by the engine 106 in accordance with the present disclosure.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure.

What is claimed is:

1. A system for generating an augmented reality environment from a two-dimensional illustration of a floorplan, comprising:
   means for capturing an image of a two-dimensional illustration of a floorplan; and
   a processor in communication with the means for capturing the image, the processor:
      detecting a target area comprising the two-dimensional illustration of the floorplan based on a set of augmented reality markers, the set of augmented reality markers being positioned proximate to the two-dimensional illustration of the floorplan;
      processing the two-dimensional illustration of the floorplan to detect two-dimensional line segments within the detected target area; and
      generating a three-dimensional model based on the processed two-dimensional illustration of the floorplan by projecting each detected two-dimensional line segment into a three-dimensional reference plane where the augmented reality markers are positioned; and
      rendering the three-dimensional model in the augmented reality environment.

2. The system of claim 1, wherein the means for capturing the image comprises a camera and the two-dimensional illustration is one of a sketch, a drawing, a design, a picture, a painting or a type of two-dimensional rendering.

3. The system of claim 1, wherein the processor processes at least one of an intrinsic parameter and an extrinsic parameter.

4. The system of claim 1, wherein the augmented reality environment is displayed on one of a smart phone, a tablet, a computer, a virtual reality headset or virtual reality goggles.

5. The system of claim 1, wherein the processor captures a set of patterned images comprise different perspectives and each patterned image among the set of patterned images comprises a chess pattern.

6. The system of claim 5, wherein the processor:
   detects two-dimensional interior corners of each patterned image among a set of patterned images by applying a computer vision algorithm to each patterned image;
   determines a three-dimensional to a two-dimensional correspondence based on a dimension of each square zone and a number of square zones of each patterned image; and
   minimizes, based on the determined at least one parameter of the image capture source, an error between projected three-dimensional points on a plane of the image capture source and the detected two-dimensional corners.

7. The system of claim 1, wherein the processor calibrates the image capture source.

8. The system of claim 1, wherein the processor:
   detects the set of augmented reality markers in the two-dimensional illustration;
   determines a set of points and a set of parameters for each augmented reality marker among the set of detected augmented reality markers; and
   detects the target area comprising the two-dimensional illustration based on a determined respective interior corner of each augmented reality marker among the detected set of augmented reality markers.

9. The system of claim 1, wherein the processor:
- calculates an intersection between the three-dimensional reference plane and an eye ray passing through an optical center and corners of the two-dimensional illustration;
- projects the three-dimensional model onto the three-dimensional reference plane;
- elevates the three-dimensional model to a predetermined height to build a volumetric three-dimensional space; and
- connects corresponding vertices of the generated three-dimensional model by vertical three-dimensional edges.

10. The system of claim 1, wherein the processor renders the three-dimensional model by projecting the three-dimensional model onto a plane of the image capture source based on the determined at least one parameter of the image capture source and the calculated position and orientation of the image capture source.

11. A method for generating an augmented reality environment from a two-dimensional illustration, comprising:
- detecting a target area comprising the two-dimensional illustration of the floorplan based on a set of augmented reality markers, the set of augmented reality markers being positioned proximate to the two-dimensional illustration of the floorplan;
- processing the two-dimensional illustration of the floorplan to detect two-dimensional line segments within the detected target area;
- generating a three-dimensional model based on the processed two-dimensional illustration of the floorplan by projecting each detected two-dimensional line segment into a three-dimensional reference plane where the augmented reality markers are positioned; and
- rendering the three-dimensional model in the augmented reality environment.

12. The method of claim 11, wherein the means for capturing the image comprises a camera and the two-dimensional illustration is one of a sketch, a drawing, a design, a picture, a painting or a type of two-dimensional rendering.

13. The method of claim 11, further comprising processing at least one of an intrinsic parameter and an extrinsic parameter.

14. The method of claim 11, wherein the augmented reality environment is displayed on one of a smart phone, a tablet, a computer, a virtual reality headset or virtual reality goggles.

15. The method of claim 11, further comprising capturing a set of patterned images comprise different perspectives and each patterned image among the set of patterned images comprises a chess pattern.

16. The method of claim 15, further comprising:
- detecting two-dimensional interior corners of each patterned image among a set of patterned images by applying a computer vision algorithm to each patterned image;
- determining a three-dimensional to a two-dimensional correspondence based on a dimension of each square zone and a number of square zones of each patterned image; and
- minimizing, based on the determined at least one parameter of the image capture source, an error between projected three-dimensional points on a plane of the image capture source and the detected two-dimensional corners.

17. The method of claim 11, further comprising calibrating the image capture source.

18. The method of claim 11, further comprising:
- detecting the set of augmented reality markers in the two-dimensional illustration;
- determining a set of points and a set of parameters for each augmented reality marker among the set of detected augmented reality markers; and
- detecting the target area comprising the two-dimensional illustration based on a determined respective interior corner of each augmented reality marker among the detected set of augmented reality markers.

19. The method of claim 11, further comprising:
- calculating an intersection between the three-dimensional reference plane and an eye ray passing through an optical center and corners of the two-dimensional illustration;
- projecting the three-dimensional model onto the three-dimensional reference plane;
- elevating the three-dimensional model to a predetermined height to build a volumetric three-dimensional space; and
- connecting corresponding vertices of the generated three-dimensional model by vertical three-dimensional edges.

20. The method of claim 11, further comprising rendering the three-dimensional model by projecting the three-dimensional model onto a plane of the image capture source based on the determined at least one parameter of the image capture source and the calculated position and orientation of the image capture source.

21. A non-transitory computer readable medium having instructions stored thereon for generating an augmented reality environment from a two-dimensional illustration which, when executed by a processor, causes the processor to carry out the steps of:
- detecting a target area comprising the two-dimensional illustration of the floorplan based on a set of augmented reality markers, the set of augmented reality markers being positioned proximate to the two-dimensional illustration of the floorplan;
- processing the two-dimensional illustration of the floorplan to detect two-dimensional line segments within the detected target area;
- generating a three-dimensional model based on the processed two-dimensional illustration of the floorplan by projecting each detected two-dimensional line segment into a three-dimensional reference plane where the augmented reality markers are positioned; and
- rendering the three-dimensional model in the augmented reality environment.

22. The non-transitory computer readable medium of claim 21, wherein the means for capturing the image comprises a camera and the two-dimensional illustration is one of a sketch, a drawing, a design, a picture, a painting or a type of two-dimensional rendering.

23. The non-transitory computer readable medium of claim 21, wherein the processor performs the step of processing at least one of an intrinsic parameter and an extrinsic parameter.

24. The non-transitory computer readable medium of claim 21, wherein the augmented reality environment is displayed on one of a smart phone, a tablet, a computer, a virtual reality headset or virtual reality goggles.

25. The non-transitory computer readable medium of claim 21, wherein the processor performs the step of capturing a set of patterned images comprise different perspectives and each patterned image among the set of patterned images comprises a chess pattern.

26. The non-transitory computer readable medium of claim 25, wherein the processor performs the steps of:
   detecting two-dimensional interior corners of each patterned image among a set of patterned images by applying a computer vision algorithm to each patterned image;
   determining a three-dimensional to a two-dimensional correspondence based on a dimension of each square zone and a number of square zones of each patterned image; and
   minimizing, based on the determined at least one parameter of the image capture source, an error between projected three-dimensional points on a plane of the image capture source and the detected two-dimensional corners.

27. The non-transitory computer readable medium of claim 21, wherein the processor performs the step of calibrating the image capture source.

28. The non-transitory computer readable medium of claim 21, wherein the processor performs the steps of:
   detecting the set of augmented reality markers in the two-dimensional illustration;
   determining a set of points and a set of parameters for each augmented reality marker among the set of detected augmented reality markers; and
   detecting the target area comprising the two-dimensional illustration based on a determined respective interior corner of each augmented reality marker among the detected set of augmented reality markers.

29. The non-transitory computer readable medium of claim 21, wherein the processor performs the steps of:
   calculating an intersection between the three-dimensional reference plane and an eye ray passing through an optical center and corners of the two-dimensional illustration;
   projecting the three-dimensional model onto the three-dimensional reference plane;
   elevating the three-dimensional model to a predetermined height to build a volumetric three-dimensional space; and
   connecting corresponding vertices of the generated three-dimensional model by vertical three-dimensional edges.

30. The non-transitory computer readable medium of claim 21, wherein the processor performs the step of rendering the three-dimensional model by projecting the three-dimensional model onto a plane of the image capture source based on the determined at least one parameter of the image capture source and the calculated position and orientation of the image capture source.

* * * * *